Aug. 17, 1937.  C. H. OERMANN  2,090,305
SLED
Filed Aug. 8, 1936  2 Sheets-Sheet 2
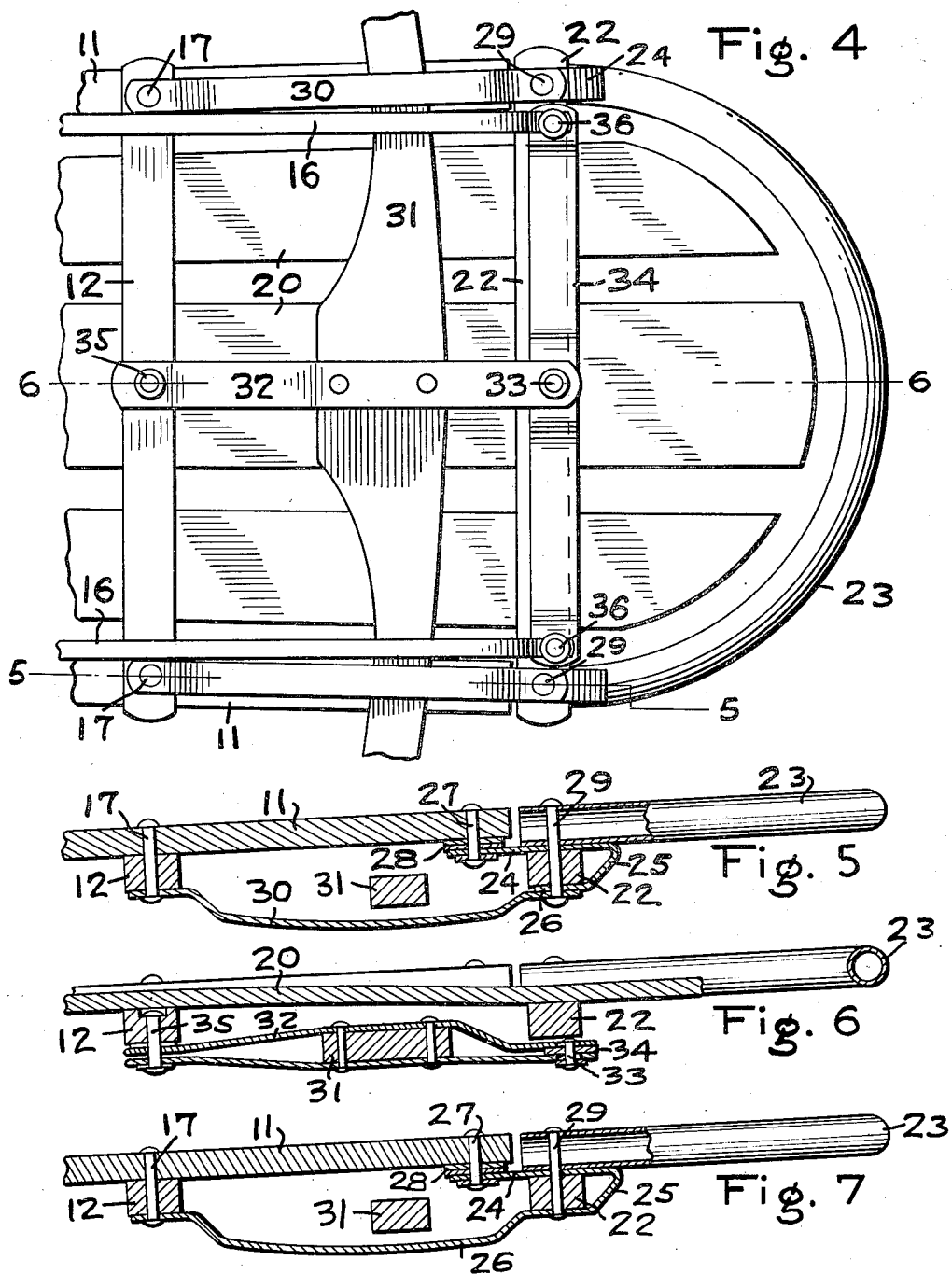
INVENTOR
CARL H. OERMANN
BY
Malcolm N. Gannett
ATTORNEY Patented Aug. 17, 1937

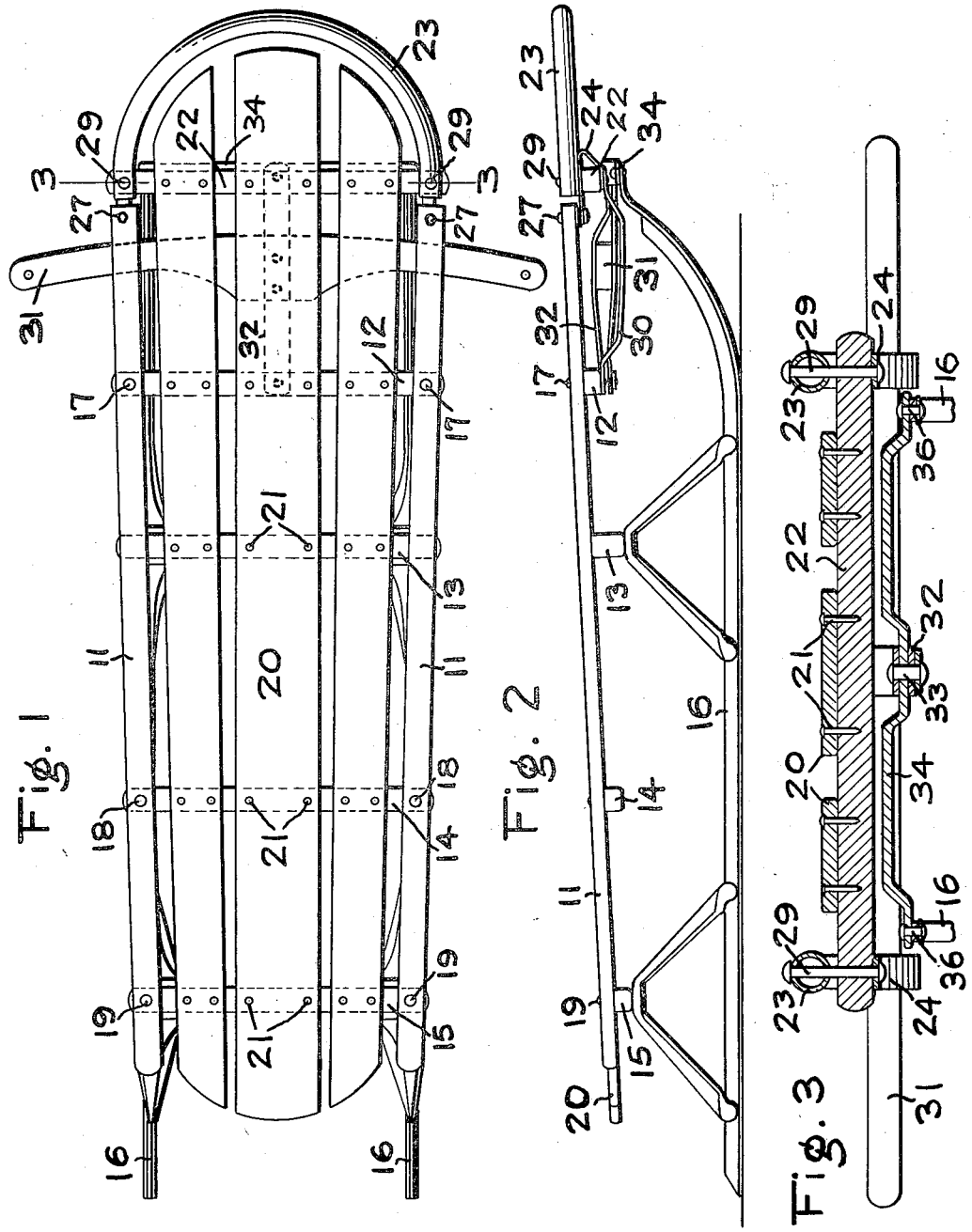

2,090,305

UNITED STATES PATENT OFFICE 2,090,305

SLED

Carl H. Oermann, York, Pa.

Application August 8, 1936, Serial No. 94,888

6 Claims. (Cl. 280—22)

This invention relates to sleds and more particularly to coasting sleds of the type having flexible runners for the purpose of steering the sleds in different directions.

An object of the invention is to provide an improved mechanism for operating the runners of coasting sleds of the type having flexible runners.

Another object of the invention is to provide an improved sled of the above type in which the parts at forward end of the sled are connected together with a minimum number of elements.

Another object of the invention is to provide an improved sled of the above type in which the seat portion of the sled overlies the runners and their operating mechanism.

Another object of the invention is to provide an improved sled of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1 is a plan of a sled constructed according to the present invention;

Fig. 2 is a side elevation of the sled shown in Fig. 1;

Fig. 3 is a transverse section taken on the line 3—3 of Fig. 1;

Fig. 4 is an inverted plan of the forward end of the sled;

Fig. 5 is a longitudinal section taken on the line 5—5 of Fig. 4 showing one form of construction;

Fig. 6 is a longitudinal section taken on the line 6—6 of Fig. 4; and

Fig. 7 is a view similar to Fig. 5 of another form of construction.

Referring to the drawings, the improved sled comprises a pair of side rails 11 which are connected at intervals by a plurality of cross bars 12, 13, 14 and 15.

Underlying the side rails 11 and supported from the cross bars 13 and 15, are runners 16.

Any type of securing elements may be used for fastening the parts together, such as rivets 17, 18 and 19, but if so desired nails, bolts, screws, etc. may also be employed.

Supported by the cross bars is the seat structure 20, preferably constructed from a plurality of boards which are fastened to the cross bars by securing elements 21, in the form of nails, tacks, rivets, bolts, and the like. As shown in Fig. 3, in the present instance the boards are fastened to the cross bars by nails.

As shown in Fig. 1, the side rails 11 terminate a suitable distance from the front end of the sled, while the boards constituting the seat structure project beyond the ends of the side rails 11.

At a point slightly in advance of the front ends of the side rails 11, the boards 20 of the seat structure are connected by means of a cross bar 22 (see Figs. 1 and 3), the boards being fastened to said cross bar by the nails or the like 21, which are employed throughout for fastening the seat structure boards to the several cross bars of the device.

The forward ends of the boards of the seat structure 11 are made arcuate in form so as to fit nicely within a curved bumper bar 23.

Preferably, the bumper bar 23 is constructed from a suitable length of pipe or tubing which is bent or curved so that the bumper bar is substantially semicircular in form.

As shown best in Figs. 2 and 4, the bumper bar 23, as well as the front portion of the seat structure 20, project a suitable distance beyond the front extremities of the side rails 11 and runners 16.

The free ends of the bumper bar 23 and the front extremities of the side rails 11 are supported from the front cross bar 22 by means of a strap or link 24.

In the preferred form of the invention, and as shown in Fig. 5, the strap or link 24 has one form, and in another form of the invention to be hereinafter more fully described, the strap or link 24 has another form.

Referring to Fig. 5, the strap or link 24 comprises a main or upper body portion which underlies the adjoining ends of the side rail 11 and the bumper bar 23, said ends being slightly spaced apart. At its forward end, the strap or link 24 is bent downwardly, as indicated at 25, and then rearwardly, as indicated at 26. The portion 26 parallels the main portion of the strap 24, and the cross bar 22 is inserted between these two portions 24 and 26 of the strap.

The main portion of the strap 24 extends rearwardly from the portion of the strap in which the cross bar 22 is disposed, so as to underlie the forward end of the side rail 11 and support the same.

The front end portion of the side rail 11 is secured to the strap 24 by means of a rivet 27 or other suitable securing means, washers 28 being interposed between the strap 24 and the side rail 11, if so desired.

Likewise, the rear end of the bumper bar 23 is secured to the strap 24 and also to the cross bar 22, by a single rivet 29 which is inserted through alined openings in the cross bar, bumper bar and strap, as shown in Fig. 5.

Underlying the side rail 11 and connecting the cross bars 12 and 22, is another strap 30, the purpose of which will be hereinafter described.

The front end of strap 30 is secured to cross bar 22 by rivet 29 and the rear end of said strap is secured to cross bar 12 by rivet 17 heretofore referred to.

The runners 16 are flexible at their forward ends and are capable of being flexed so as to guide the sled. Accordingly, said runners are connected at their forward free ends to suitable steering or operating mechanism.

In the present instance, the runner operating mechanism comprises a transversely disposed bar 31 which underlies the seat structure 20, and which is disposed between the cross bars 12 and 22.

Rigidly secured to the bar 31 is a lever 32, preferably formed from two superposed strips of suitable metal.

At its forward end, the lever 32 is pivotally connected, as at 33, to a cross bar or link 34, and at its rear end, said lever is pivotally connected, as at 35, to the cross bar 12 (see Figs. 4 and 6).

The extremities of the link 34 are, in turn, pivotally connected, as at 36, to the free front ends of the runners 16.

The construction is such that operation of the bar 31 results in the front free ends of the runners 16 being flexed or bent in a well known manner.

Since the bar 31 is supported solely by the lever 32, which in turn is supported at one end by its connection with cross bar 12 and at its other end by its connection with link 34, any tendency of the bar 31 to swing downwardly an appreciable amount will be arrested by the two straps 30 which are disposed underneath the side rails 11 of the sled, as shown in Fig. 4.

As shown in Fig. 7, if so desired the straps 24 and 30 may be made of a single length of suitable bar metal without the necessity of employing additional securing elements, since these straps are fastened to the sled by the three rivets 17, 27 and 29. In the form of the invention shown in Fig. 7, the portion 26 of the strap is made long enough to extend back to the cross bar 12 and such portion of the strap can be shaped to correspond to the contour of strap 30 shown in Fig. 5, so as to normally be spaced a suitable distance from the bar 31.

Having thus described my invention what I claim is:

1. A sled comprising side rails, cross bars connecting said side rails, a seat structure supported by said cross bars, said seat structure extending beyond the front ends of said side rails, a cross bar underlying said seat structure at a point adjacent to but forward of the front ends of said side rails, a pair of runners underlying said side rails and supported by said cross bars, a bumper bar encircling the front end of said seat structure, a strap extending from the front end of each side rail forwardly under the end of said bumper bar and from thence rearwardly under said front seat structure cross bar, means for securing said strap to said side rail, and means for securing said strap to said front seat structure cross bar and said bumper bar whereby said bumper bar and the front end of said side rail are supported by said front seat structure cross bar.

2. A sled comprising a frame having a front cross bar, runners connected to said frame at opposite sides thereof and extending rearwardly from said cross bar, a bumper bar encircling the front end of said frame and projecting forwardly from the front ends of said runners, a strap extending from the front portion of the frame forwardly under the end of said bumper bar and from thence rearwardly under said cross bar, and means for securing said strap to said frame, said cross bar and said bumper bar.

3. A sled comprising a frame having a front cross bar, runners connected to said frame at opposite sides thereof and extending rearwardly from a point adjacent said cross bar, a bumper bar encircling the front end of said frame and overlying said cross bar, a strap extending from the front portion of the frame forwardly under the end of said bumper bar and from thence rearwardly under said cross bar, and means for securing said strap to said frame, said cross bar and said bumper bar.

4. A sled comprising a frame having a front cross bar, runners connected to said frame at opposite sides thereof and extending rearwardly from a point adjacent said cross bar, a bumper bar encircling the front end of said frame and overlying said cross bar, steering mechanism for said sled entirely beneath said frame at the rear portion of said bumper bar and including a steering arm extending transversely of said frame and having end portions projecting laterally outwardly beyond opposite sides of said frame, a strap extending from the front portion of the frame forwardly under the end of said bumper bar and from thence rearwardly under said cross bar, and means for securing said strap to said frame, said cross bar and said bumper bar.

5. A sled comprising a frame having a front cross bar, runners connected to said frame at opposite sides thereof and extending rearwardly from a point adjacent said cross bar, a bumper bar encircling the front end of said frame and overlying said cross bar, steering mechanism for said sled beneath said frame at the rear portion of said bumper bar and including a steering arm extending transversely of said frame and having end portions projecting laterally outwardly beyond opposite sides of said frame at points in rear of the forward ends of said runners, a strap extending from the front portion of the frame forwardly under the end of said bumper bar and from thence rearwardly under said steering arm, and means for securing said strap to said frame, said cross bar and said bumper bar.

6. A sled comprising a frame having a front cross bar, runners connected to said frame at opposite sides thereof and extending rearwardly from a point adjacent said cross bar, a bumper bar encircling the front end of said frame and overlying said cross bar, steering mechanism for said sled entirely beneath said frame at the rear of said front cross bar and including a steering arm extending transversely of said frame and having end portions projecting laterally outwardly beyond opposite sides of said frame, a strap extending from the front portion of the frame forwardly under the end of said bumper bar and from thence rearwardly under said cross bar, and a second strap underlying the first strap and extending from said cross bar rearwardly under said steering arm to said frame.

CARL H. OERMANN.